Sept. 26, 1944.  R. N. ROWE  2,359,247

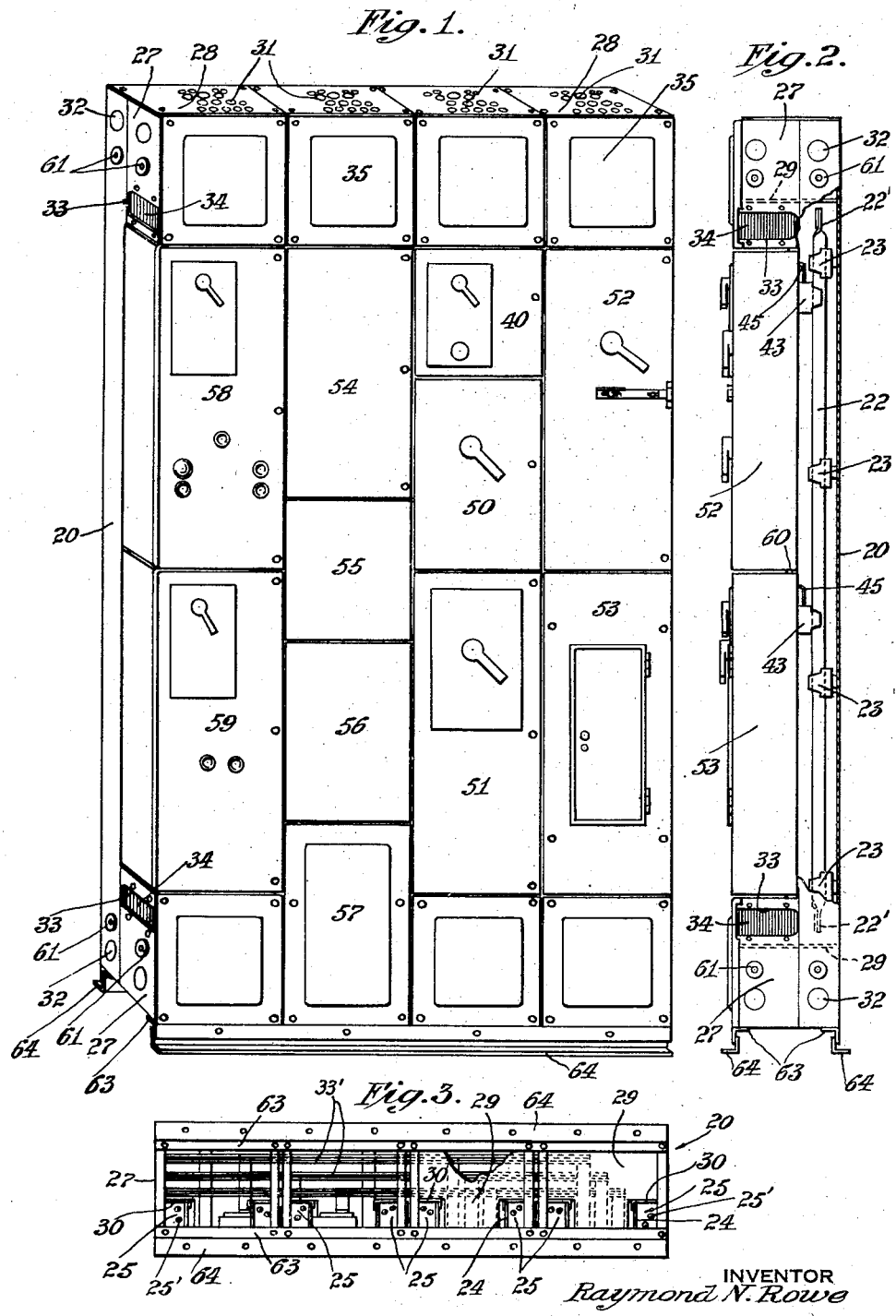

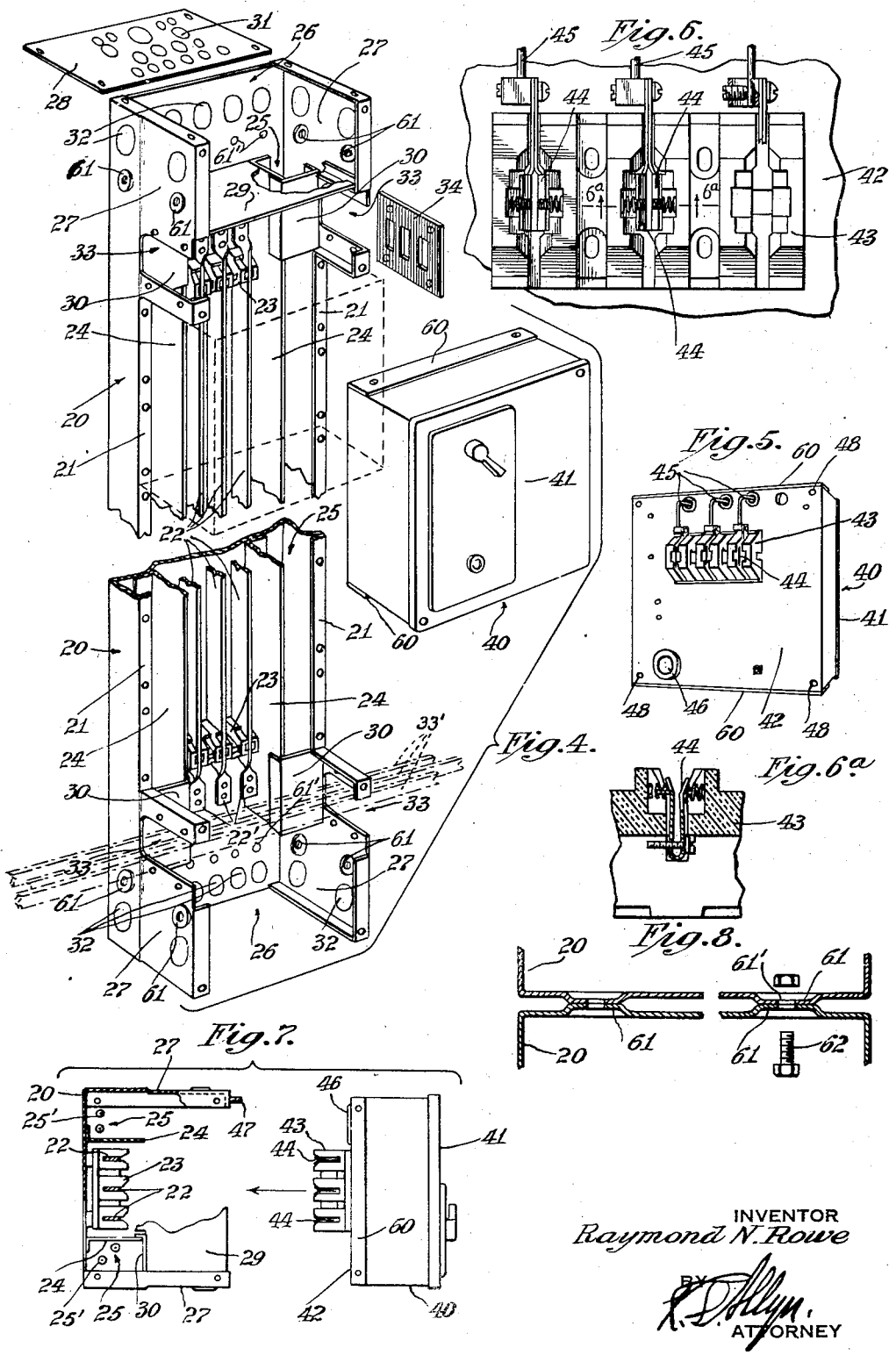

POWER DISTRIBUTION SYSTEM

Filed July 19, 1941  3 Sheets-Sheet 3

INVENTOR
Raymond N. Rowe

BY
ATTORNEY

Patented Sept. 26, 1944

2,359,247

UNITED STATES PATENT OFFICE 2,359,247

POWER DISTRIBUTION SYSTEM

Raymond N. Rowe, Plainville, Conn., assignor to The Trumbull Electric Manufacturing Company, Plainville, Conn., a corporation of Connecticut Application July 19, 1941, Serial No. 403,164

14 Claims. (Cl. 175—307)

My invention relates particularly to a centralized control panel or control center serving as a center for the control of a number of distribution circuits leading to various current consuming devices, such as heaters, welders and power driven devices.

The control of such circuits requires various forms and sizes of motor starters, disconnect switches, circuit breakers, indicators and other similar devices.

The present invention is the result of many years of experience and experiments in connection with systems of electrical distribution and has for its main object to provide a control center of compact design, the parts of which can be made according to standard pattern and in unit or multiple unit sizes and readily assembled, arranged, rearranged, altered and changed according to the changing conditions of circuit requirements.

In its preferred form, the system consists of a number of vertical troughs containing bus bars connected to the power supply. These troughs are open at the front except at the ends which constitute pull boxes and are secured together side by side to form a sort of self-supporting pedestal or bank. The control units are in the form of boxes which are applied to the open fronts of the troughs and have contact terminals engaging the respective bus bars in the troughs. The branch circuits lead from the boxes back into channels in the troughs. The various troughs and boxes can be put together like building blocks and readily changed to suit the constantly changing needs of modern factory work. The boxes provide for the complete closure of the troughs and have front covers with their operating handles, buttons, lights and indicators arranged on the front.

These bus bar troughs and control boxes are so constructed that they can be readily assembled either in the form of a flat wall panel or with some units facing at right angles to others or in fact in the form of a column with control units facing in from different directions.

Fig. 1 is an isometric perspective view on a small scale of a typical arrangement constituting a wall panel involving one form of my invention.

Fig. 2 is a side view and partial section of the same.

Fig. 3 is a bottom view of the same, parts being broken away.

Fig. 4 is a perspective view of a single stack or trough on a larger scale showing its bus bars and channels and a single control unit detached and showing in dotted lines transverse bus bars.

Fig. 5 is a perspective rear view of a control unit on a small scale.

Fig. 6 is a fragmentary rear view of the plug-in type of box terminals on a still larger scale.

Fig. 6a is an enlarged detail sectional view on the line 6a—6a of Fig. 6, showing the manner of securing contact blades to the block.

Fig. 7 is a plan view and partial section of the trough and box of Fig. 4.

Fig. 8 is a fragmentary sectional view showing the meeting sides of two troughs.

Figure 9:
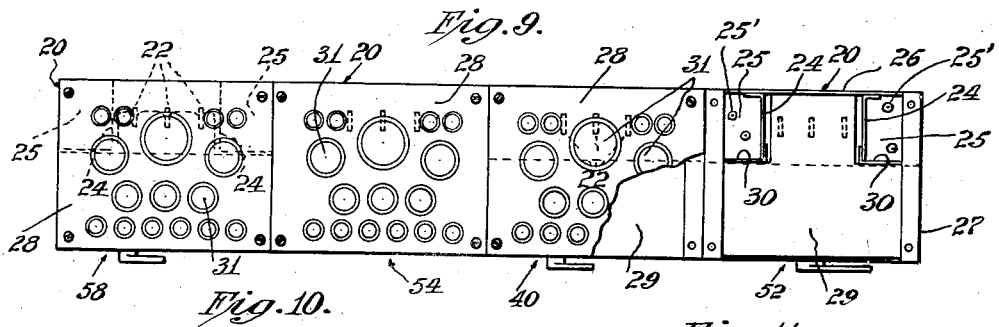
Fig. 9 is a view partly diagrammatic and partly plan showing one way of arranging a number of troughs and control units.

Figs. 10 to 15, inclusive, are diagrammatic plan views showing various ways in which a number of troughs and control units of my invention may be arranged.

The entire construction is built up of a number of vertical sections, each of which consists of a main conductor trough and a number of attached units. Each trough 20 is of a U-shaped cross section open at the front and provided with inwardly turned flanges 21. In this trough are mounted bus bars 22 which are supported by insulators 23, the ends 22' of the bars preferably being twisted to facilitate support and connection of main line cables or transverse bus bars for instance (not shown).

I also provide one or more vertical partitions 24 secured to the back of the trough so as to provide a channel such as 25 at one side or the other or at both sides of the bus bars for conductors 25'. At one or both ends and preferably at the top and bottom of the trough I provide a pull box chamber 26 formed by extensions 27 connected to the sides of the trough and end pieces such as 28. In some cases a bottom plate 29 is provided and also a cover plate 30 at the end of each channel 25. The pull box is provided with outlets such as 31 and 32 which may initially be closed by conventional knockouts. Each pull box may also be provided with a cutout portion or slot 33 to facilitate the horizontal or cross connection for bus bars 33' between adjacent sections. Such slots may be initially closed by insulating plates 34 which are perforated to receive the transverse bus bars.

The front of the pull box is preferably closed by means of a detachable cover plate 35 as shown in Fig. 1.

The control units such as 40 may be of various sizes and contain the necessary mechanism suitable to the control of the various circuits as required. Each unit will have a face plate 41 preferably flanged and usually hinged to the body of the box in the usual manner. The back plate 42 of the control unit box is provided with an insulating block 43 in which are mounted the terminal contact blades or jaws 44 connected to the mechanism inside of the box by conductors 45 and adapted to be readily connected to the respective bus bars in the trough by simply applying the control box to the front of the trough. Branch conductors 25' from the control box may pass through insulating bushings 46 in the back of the box and be housed in a channel 25 in the main trough. The control box is secured to the flanges 21 of the trough by suitable screws or bolts. These bolts such as 47 are preferably secured in or to the flanges of the trough and project forwardly so that the holes 48 in the back of the box may register with the ends of the bolts to facilitate assembly.

The control units are preferably made up of various multiples of a unit dimension so that a number of the control units may be assembled into a complete control board for instance as shown in Fig. 1. In this case the unit 40 happens to represent the smallest unit which is twice the height of the fundamental dimension. Unit 50 is three times this fundamental dimension. Unit 51 is five times this dimension. Unit 52 is five times. Unit 53 represents conventionally a panel box containing individual switches (not shown) and is of the same height as unit 51. The stack units of the next to the left hand stack in this instance may be regarded as a blank since the covers 54, 55, 56 and 57 replace the control units and in fact the cover 57 takes the place of the cover of a pull box at the lower end of the stack. The units 58 and 59 represent controls containing indicating devices and provided with not only a suitable switch or circuit breaker but also with push button operators as are commonly employed in systems of this character. It will be noted that all of the control units and troughs are of the same width so that when assembled they represent an orderly and compact structure. As above mentioned the covers of the control units are preferably flanged and consequently projected somewhat from the upper and lower surface of the boxes. I therefore may provide spacer strips 60 which are of substantially the same thickness as the metal of the cover and therefore serve to space the respective units of a given stack from each other.

I provide for the lateral spacing of the troughs in a different manner as shown in Fig. 8 where the sides of the adjacent troughs are provided with projecting bosses 61 having perforations 61' (Fig. 8) which are united by bolts 62 when the stacks are assembled. These bosses constitute in effect spacing washers.

Although the entire construction when assembled is self-supporting without the necessity of additional frame work, I prefer to provide connecting angle irons such as 63 at the bottom which may themselves be supported on angles 64 constituting feet, the connection between the upper and lower angle irons being of a conventional vertical adjustable type so as to permit levelling up.

By the arrangements shown, the main cables come in through knockouts 31 or 32 in the ends, sides or backs of the stacks. Within the pull box area at the top or bottom of a stack these main cables are connected to the bus bars 22. Branch circuit cables are also brought into the pull box areas through knockouts 31 or 32, but are isolated from the main bus bars by being laid in the channels 25 formed by the barriers 24. The proper control unit for a given branch circuit is then selected, and the branch circuit cables are connected to the unit through the hole 46 in the back of the unit. Then, by simply applying that unit to the bus bars, the final connection of the branch to the main circuit is made. Wires or cables for signal circuits or for push-button control circuits can also be laid in the channels 25 to isolate them from the main bus bars.

All parts in the front of the assembly are level or flush with one another, thus presenting a finished appearance. The pull-box areas are built out to the same level as the fronts of the branch units, and any "blank" or spacer units are built as boxes to maintain this same level at the front.

Figure 10:
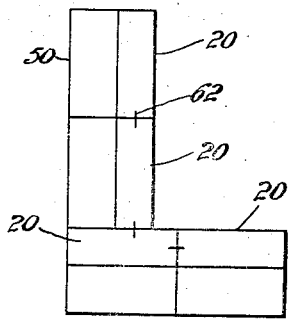

On the third sheet of drawings, I have shown diagrammatically the way in which a number of stacks may be connected together and arranged with their operating faces exposed in various ways. For instance, in Fig. 9, the troughs 20 are all arranged in a row with the control units 40, 50 etc. attached to the fronts of the troughs thus constituting a flat faced panel board construction. In Fig. 10, I have also shown four stacks with two stacks of control units facing in one direction and the other two in a direction at right angles thereto.

Figure 11:
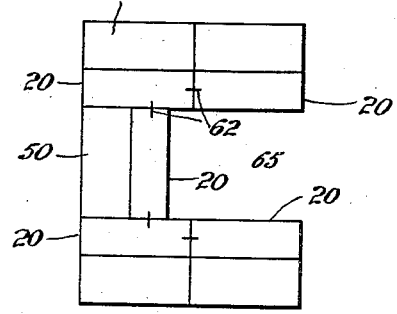

In Fig. 11 I have shown five stacks where the troughs are connected in such a manner that two of the sets of control units face in one direction, two in the opposite direction and one in a direction at right angles to the other two, thus leaving a space 65. Such an installation is suitable for erection about three sides of a pillar or column.

Figure 12:
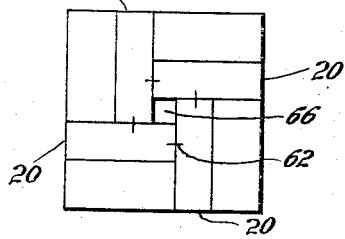

In Fig. 12, I have shown four stacks in which the troughs are secured together in such a way as to provide for the four sets of control units to face in four different directions. The proportions are such that in this case there is a small space 66 in the center which might provide for a column or pipe for any desired purpose.

Figure 13:
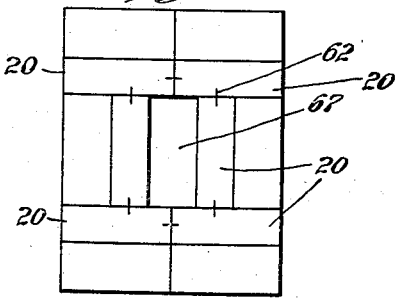

In Fig. 13, I have shown an assembly of six stacks arranged around a central space 67. This is similar to the arrangement of Fig. 11 with the simple addition of another stack.

Figure 14:
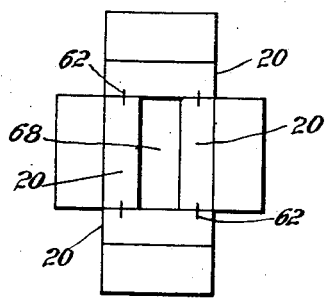

Fig. 14 shows an assembly of four stacks with a central space 68.

Figure 15:
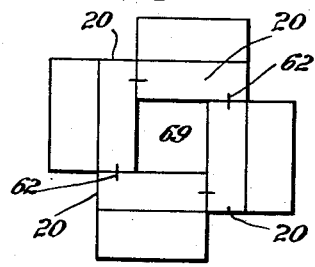

Fig. 15 shows an assembly of four stacks arranged to provide a square sectioned space 69.

In each case, it will be seen that the adjacent troughs are secured together for instance by bolts such as 62 as above described, the troughs being provided with holes 61' suitably located to accommodate such connecting bolts in arrangements like Figs. 10 to 15.

It will thus be seen that a very simple and flexible system is provided in which all of the parts are entirely accessible from the front and which presents a very neat and orderly appearance.

I claim:

1. In a power distribution system, a control panel including vertically disposed troughs having open front portions for bus bars and branch cables, detachable branch circuit boxes containing control devices completely covering the open fronts of said troughs and operatively connected to the bus bars and means for connecting the troughs to each other at different angular positions so that the open front portions are facing outwardly.

2. In a power distribution system, a control panel including vertically disposed troughs having open front portions and open top and bottom ends for bus bars and branch cables, detachable branch circuit boxes containing control devices completely covering the open fronts of said troughs and operatively connected to the bus bars, detachable pull boxes closing the open top and bottom ends thereof and means for connecting the troughs to each other at different angular positions so that the open front portions are facing outwardly.

3. In a power distribution system, a control panel including a number of vertical rectangular shaped troughs, each trough having rear and side walls and an open front, the side walls at each end extending forwardly of the front of the trough to form enlarged trough portions at said ends for receiving bus bars and branch cables, branch circuit boxes containing control devices covering the fronts of the troughs between said enlorged portions and extending forwardly thereof, said boxes having rearwardly projecting contact blades extending into said troughs and engaging the bars therein and box covers for said enlarged trough portions to enclose the ends of the troughs.

4. A switch panel construction comprising a series of vertically disposed channels having side flanges and arranged side by side and each containing vertical bus bars, means for securing walls of adjacent channels together, transverse bus bars connecting vertical bus bars in adjacent channels and a number of switch boxes secured to the side flanges of the channels, each box containing switch mechanism and having contact stabs in the rear detachably connected to vertical bus bars in one of the channels and an actuating handle at the front, the fronts of the respective boxes forming the front of the panel construction, the upper and lower ends of the vertical channels having chambers forming pull boxes and each chamber having a detachable cover in the same plane with the fronts of the switch boxes.

5. A panel board for a power distribution system comprising a number of vertical troughs secured together, each trough being open at the front, vertical bus bars in each trough, each trough having a vertical cable-containing channel along at least one side, pull boxes at the upper and lower ends of the troughs communicating with respective channels and having front cover plates, removable switch box units secured to said troughs and having contact stabs at the rear detachably connected with the respective bus bars, each switch box unit having a front plate with an operating handle, the front plates of the switch boxes coacting with the front plates of said pull boxes to form a substantially flush front of the panel board.

6. As an article of manufacture, a panel section comprising a trough having a bottom and side walls and open at the front, the side walls at the ends extending further than the intermediate parts of the side walls outward from the bottom wall to form pull box end chambers, partitions in the trough to form cable-containing channels communicating with said chambers, bus bars supported in the trough between said partitions, a row of control boxes detachably secured to the side walls of the trough and having contacts engaging the respective bus bars, said pull box chamber and said control boxes having front plates constituting a substantially flush front of the panel section.

7. A panel board section comprising a trough having a bottom and side walls, bus bars secured in the trough, a partition between the bus bars and one side wall to form a cable channel, a transverse plate across the trough near one end to form a pull box chamber with a passage communicating with the cable channel, the end walls of the trough having cable openings, a front plate for the pull box chamber, a row of control units secured to the side walls of the trough and each having contact stabs at the rear engaging the bus bars and a cover and actuating lever at the front, the covers of the control units and the front plate of the pull box forming a substantially flush front for the section.

8. In a power distribution system, a control panel including a number of vertical rectangular shaped troughs, each trough having rear and side walls and an open front, vertical bus bars in said troughs, the side walls at each end of each trough extending forwardly of the front of the trough to form enlarged trough portions for receiving transverse bus bars and branch cables, said enlarged portions being formed with aligned slots in their sides, branch circuit boxes containing control devices covering the fronts of the troughs between said enlarged portions and extending forwardly thereof, said boxes having rearwardly projecting contact blades extending into said troughs and engaging the bars therein and means in each of said slots provided with openings to permit transverse bus bars to extend therethrough.

9. In a power distribution system, a panel unit comprising a vertical trough having a back with side walls with inturned flanges, parts of the side walls and flanges at the ends of the trough extending further forward than the parts of the walls and flanges intermediate said end parts, switch unit boxes secured to the intermediate flange parts, cover plates secured to the end flange parts in substantially the same plane as the fronts of the switch unit boxes, and bus bars supported in the trough having terminals in the spaces behind the cover plates, the switch units having terminal members detachably engaging the respective bus bars.

10. A panel unit comprising a vertical trough having a back with side walls with inturned flanges, parts of the flanges at the ends of the trough extending further forward than the flange parts intermediate said end parts, switch unit boxes mounted on the intermediate flange parts, cover plates secured to the end flange parts in substantially the same plane as the fronts of the switch unit boxes, bus bars supported in the trough having terminals in the spaces behind the cover plates, the switch units having terminal members engaging the respective bus bars and means concealed within the switch units for securing the switch units to the trough.

11. A panel unit comprising a vertical trough having a back with side walls with flanges, parts of the side walls and flanges at the ends of the trough extending further forward than the walls and flanges intermediate said parts, switch unit boxes secured to the intermediate flanges, cover plates secured to the end flange parts in substantially the same plane as the fronts of the switch unit boxes, cover plates on the ends of the trough and bus bars supported in the trough having terminals in the spaces formed by the ends of the trough and the cover plates, the switch units having terminal members engaging the respective bus bars and the ends of the trough having conductor openings leading to the bus bar terminals.

12. A panel-board section comprising a vertical sheet metal trough-like member closed at the top and bottom and having a back wall and two side walls with flanges at the front edges, vertical bus bars supported in said trough-like member and insulated therefrom and having terminals at their upper and lower ends within said trough-like member, the ends of the trough-like member having means for access to the terminals therein and a plurality of discrete enclosed switch control boxes of the same width as said trough-like member mounted one above the other on the front of said trough-like member and detachably secured to said flanges, the switch mechanisms having contact blades extending from the back of the respective boxes and detachably engaging the bus bars in said trough-like member, said control boxes having cover plates at the front provided with operating handles for the switch mechanism contained therein, said trough-like member being adapted to be secured to a side of another similar member or to the back of a similar member.

13. A panel-board section comprising a vertical sheet metal trough-like member having a back wall and two side walls with flanges at the front edges, the side walls of at least one end of the trough-like member extending forwardly beyond the adjacent side walls, front and end walls forming in conjunction with the adjacent extended side walls and the adjacent end of the back wall a terminal chamber, vertical bus bars supported in said trough-like member and insulated therefrom and having terminals within said chamber, at least one wall of said chamber having means for access to the terminals therein, and a plurality of discrete enclosed switch control boxes of the same width as said trough-like member mounted one above the other at the front of said member and detachably secured to said flanges, the switch mechanism in the boxes having contact blades extending from the back of the boxes and engaging the bus bars in said trough-like members, said boxes having cover plates at the front provided with operating handles for the switch mechanism.

14. A switch panel construction comprising a series of vertically disposed channels having side flanges and arranged side by side and each containing vertical bus bars, means for securing walls of adjacent channels together, transverse bus bars connecting vertical bus bars in adjacent channels and a number of switch boxes secured to the side flanges of the channels, each box containing switch mechanism and having contact stabs in the rear detachably connected to vertical bus bars in one of the channels and an actuating handle at the front, the fronts of the respective boxes forming the front of the panel construction, each vertical channel at least at one of its ends being formed with terminal chambers and having detachable cover plates for said chambers permitting access to said chambers without disturbing the switch boxes.

RAYMOND N. ROWE.